Aug. 5, 1958   C. G. BALKAUSKAS   2,845,895
COLLAPSIBLE CAGE
Filed May 24, 1957

INVENTOR.
Casimer G. Balkauskas,
BY
McMorrow, Berman & Davidson
ATTORNEYS

# United States Patent Office 2,845,895
Patented Aug. 5, 1958

2,845,895
COLLAPSIBLE CAGE

Casimer G. Balkauskas, South Boston, Mass.

Application May 24, 1957, Serial No. 661,464

3 Claims. (Cl. 119—17)

This invention relates to an improved vertically collapsible cage for such as birds.

The primary object of the invention is to provide a practical and convenient cage of this kind which is readily collapsible to a small bulk for storage and transportation.

Another object of the invention is to provide a collapsible cage comprising a top and a bottom, the top incorporating means for suspending the cage from a suitable support, and a reticulated side wall between the top and the bottom which is flexible and deformable to enable collapsing of the side wall and to preclude injury to a bird flying thereagainst.

A further object of the invention is to provide a collapsible cage of the character indicated, which can be made in attractive, rugged, and serviceable forms at relatively low cost, is easily used and maintained, and is highly satisfactory and acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1:
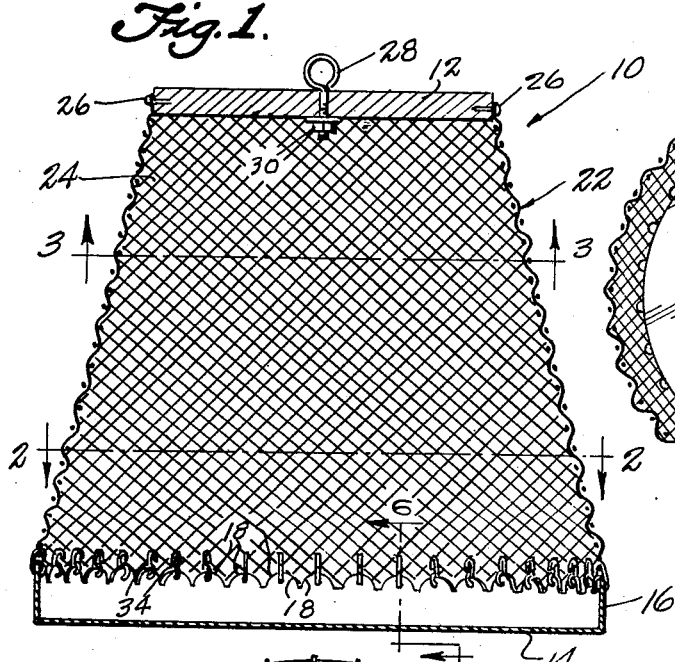
Figure 1 is a vertical transverse sectional view taken through a collapsible cage of the invention and showing the cage in expanded condition.
Figure 3:
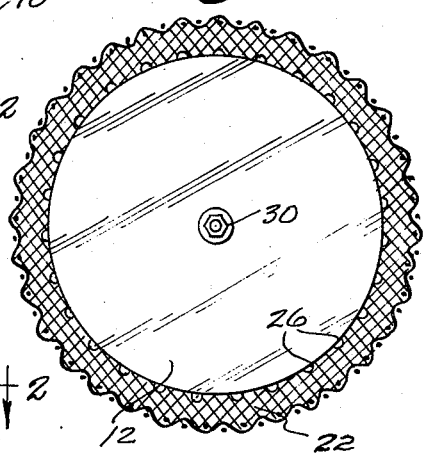
Figure 3 is a horizontal section taken substantially on the plane of line 3—3 of Figure 1.
Figure 2:
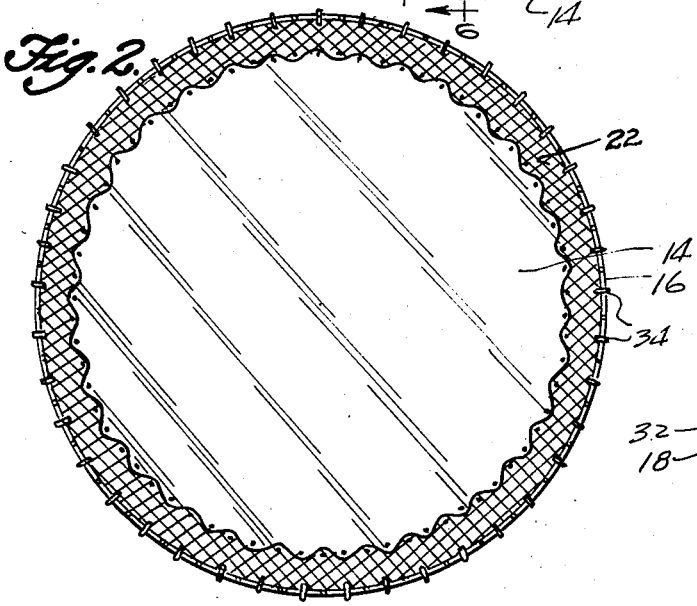
Figure 2 is a horizontal section taken substantially on the plane of line 2—2 of Figure 1.
Figure 5:
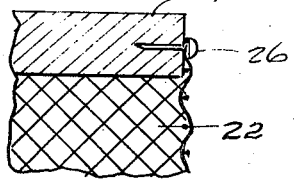
Figure 5 is an enlarged fragmentary vertical section showing the upper end of the cage side wall secured to the top of the edge.

Referring in detail to the drawings, the illustrated cage, indicated generally at 10, comprises a flat circular top 12 which is a plate of wood or any other suitable material, a circular pan-shaped bottom 14 of metal, plastic, or the like having an annular peripheral flange 16. The peripheral flange 16 has on its upper edge closely spaced rounded lugs 18 having holes 20 therein.

The cage further comprises a collapsible reticulated side wall, indicated generally at 22, in the form of a truncated cone of flexible screen material 24, formed of interwoven strands of synthetic or natural material. The side wall 22 is indicated at 24 and comprises a plurality of suitable interwoven threads of a synthetic or natural material. The body member 24 is secured in circumposed relationship about the peripheral edge of the top 12 by means of suitable fasteners, such as tacks 26. The top 12 has extending centrally therethrough the shaft portion of a vertically extending eye 28, said shaft being retained in place by means of the suitable retaining nut 30 threaded on the lower end of the shaft of the eye against the underside of the top 12. The cage is adapted to be suspended by the eye 28 from a suitable support.

Figure 6:
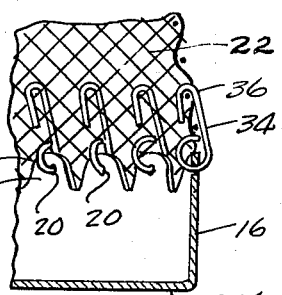
Figure 6 is an enlarged fragmentary vertical transverse section taken substantially on the plane of line 6—6 of Figure 1.

The lower end of the side wall 22 is engaged around the outer side of the flange 16 of the cage bottom 14 and is separably secured thereto by clips 34, which have loops 32 on their lower ends engaged through the holes 20 of the lugs 18, and hooks 36 on their upper ends engaged through meshes of the side wall 22, as shown in Figure 6.

Figure 4:
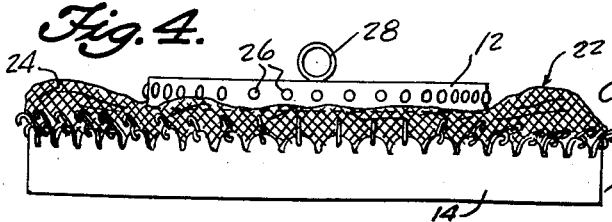
Figure 4 is a side elevational view of the cage in its collapsed condition.

Several of the clips 34 may be disengaged from the side wall 22 so that a portion of the lower edge of the side wall 22 can be moved away from the bottom flange 16 to enable removal or insertion of a bird or the like in the cage, as well as for the purpose of introducing water pans, food dishes, and the like. When a bird accidentally flies against the side wall 22, injury is avoided because of the flexible and resilient character of the side wall 22. The cage, including the side wall 22, can be readily cleaned by immersing the cage in a bath of detergent or the like. As shown in Figure 4, the cage can be collapsed to a relatively flat form of small bulk, by pressing the top 12 toward the bottom 14, and expanded from collapsed condition by pulling the top 12 upwardly so as to stretch the side wall 22 to shape.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. In a collapsible cage, a top having a peripheral edge, a bottom having a peripheral flange, elements on and spaced around said flange, a frusto-conical side wall, said side wall being of collapsible reticulated material, said side wall having an upper end secured to the peripheral edge of the top and a lower end, and means secured to said elements and separably traversing the lower end of the side wall and securing the bottom to the lower end of the side wall.

2. In a collapsible cage, a top having a peripheral edge, a bottom larger in diameter than said top and having a peripheral edge, a frusto-conical vertically collapsible reticulated side wall having upper and lower ends, said upper end being secured to the peripheral edge of the top, and clips mounted on the peripheral edge of the bottom and separably engaging the lower end of the side wall and securing the lower end of the side wall around the peripheral edge of the cage bottom.

3. In a collapsible cage, a top having a peripheral edge, a pan-shaped bottom having an upstanding peripheral flange, said flange being larger in diameter than said top, a frusto-conical vertically collapsible side wall having an upper end secured around the peripheral edge of said top, said side wall having an open lower end engaged around said peripheral flange, clips secured to and spaced around said flange, said clips having hooks separably engaged in reticulations of said side wall and securing the lower end of the side wall removably in place on the flange.

References Cited in the file of this patent
UNITED STATES PATENTS
2,538,853    Worl   ---------------- Jan. 23, 1951
FOREIGN PATENTS
857,200    France   ---------------- Apr. 8, 1940